Dec. 4, 1962　　　　E. A. MACHA ET AL　　　　3,066,989
BEARING MOUNTING ARRANGEMENT
Filed Oct. 12, 1959　　　　　　　　　　　　3 Sheets-Sheet 1

Dec. 4, 1962 E. A. MACHA ET AL 3,066,989
BEARING MOUNTING ARRANGEMENT
Filed Oct. 12, 1959 3 Sheets-Sheet 3

United States Patent Office 3,066,989
Patented Dec. 4, 1962

3,066,989
BEARING MOUNTING ARRANGEMENT
Edward A. Macha, Wilmerding, Pa., and Oliver P. Steele, III, Canoga Park, Calif., assignors to Westinghouse Electric Corporation, East Pittsburgh, Pa., a corporation of Pennsylvania
Filed Oct. 12, 1959, Ser. No. 845,808
13 Claims. (Cl. 308—77)

The present invention is directed generally to bearing mounting arrangements and more particularly to new and improved bearing mounting arrangements for bearings utilized in high temperature applications.

As is known when rotatable shafts are subjected to high temperature operation, the common practice has been to utilize sleeve or journal bearings as the anti-frictional means for the shafts. As is also known, ball and roller bearings have certain advantages over journal bearings in that they will maintain relatively accurate alignment of parts over long periods of time and are capable of carrying heavy momentary loads without seizure or failure. Ball and roller bearings, however, are limited in their applications with high temperature systems by the lubricating means for the bearings. For example, there are applications wherein a shaft on which the bearing is mounted is maintained at a temperature higher than the maximum allowable operating temperatures of the bearing. One determining parameter of the maximum allowable operating temperature of ball and roller bearings is the temperature at which the oil or grease lubricating the bearing will break down and cause galling. If such is the case, loss of lubrication and excessive loading due to differential expansion will result and cause bearing failure.

Other considerations for the use of ball or roller bearings are the particular mounting arrangements therefor. It is essential that the inner support structure for the bearing be a light press fit on the shaft. A fit that is too loose allows the inner support structure to slip excessively and a fit that is too tight may deform the inner support structure to such an extent that the bearing life will be greatly shortened.

The present invention is directed to a new and improved mounting structure for ball or roller bearings which permit the desired use of such bearings on shafts maintained at a temperature higher than the maximum allowable operating temperature of the bearing, and the provision of such a structure is an object of the instant invention.

Of course the novel bearing assembly of this invention is also applicable for incorporation with other bearing types, such as sleeve or journal bearings. Thus, another object of this invention is to provide a bearing mounting structure wherein the operating temperature of the bearing is substantially less than the operating temperature of the shaft on which the bearing is mounted.

Still another object of this invention is to provide a new and improved bearing mounting structure for use with a shaft subjected to high temperatures wherein heat is conducted through the bearing structure in a manner so that the bearings are not subjected to this heat.

A further object of this invention is to provide a new and improved bearing structure for use with rotating members operated at high temperatures wherein the bearing structure is provided with a heat conductive path which bypasses the bearing members.

Another object of this invention is to provide a bearing structure for use with a rotatable member operated at a high temperature wherein cooling means are provided on the bearing structure to maintain the bearings at a temperature lower than the operating temperature of the member.

Yet another object of this invention is to provide a new and improved bearing mounting structure that is maintained in spaced relation with the shaft on which the bearing is mounted.

These and other objects of this invention will become more apparent upon consideration of the following description above and the illustrative embodiment of the invention wherein.

Figure 1:
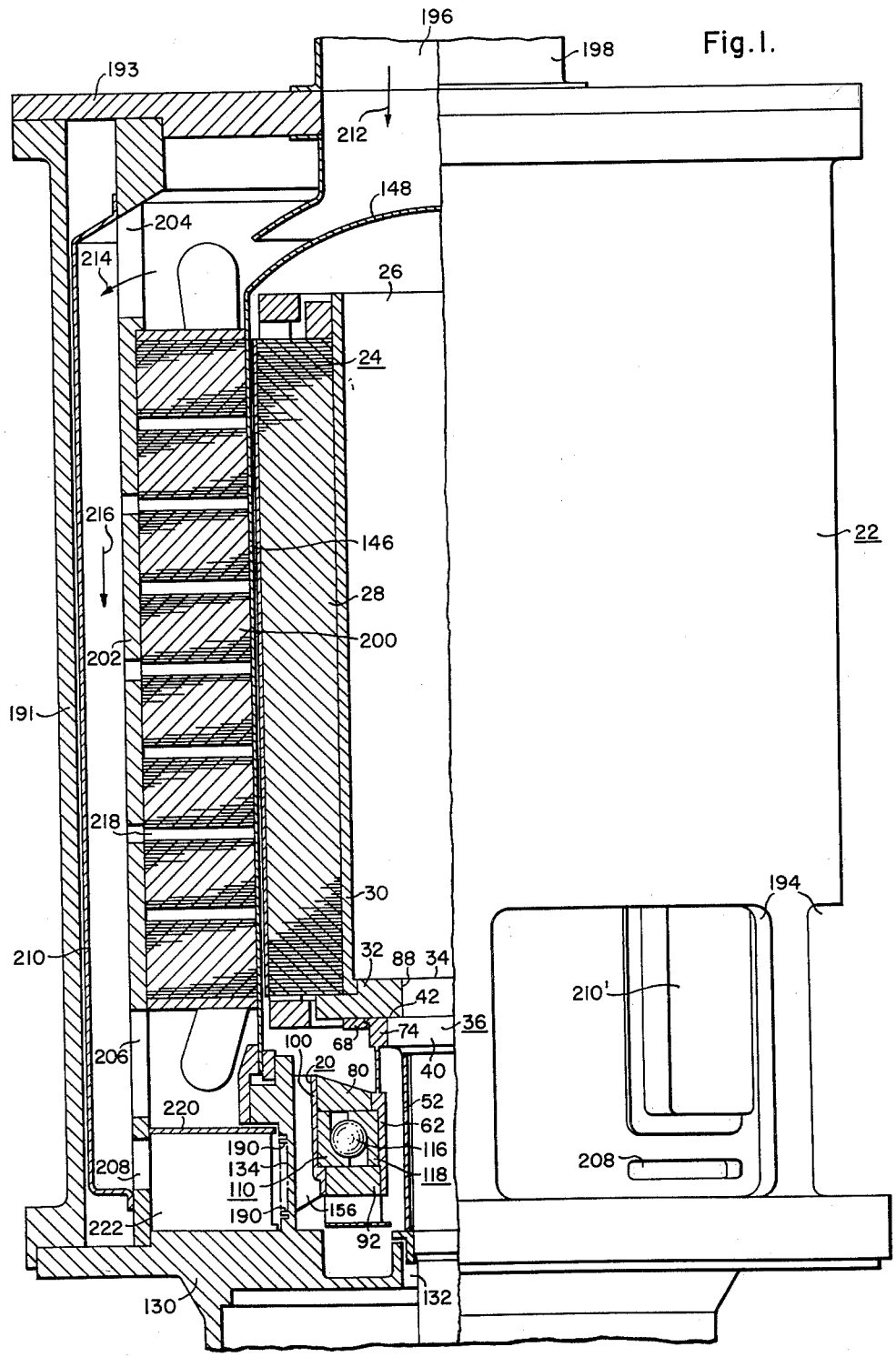
FIGURE 1 is a longitudinal view partially in elevation and partially in section of a motor having a bearing constructed in accordance with the principles of this invention and mounted thereon.

In accordance with the invention there is provided a rotatable shaft which is subjected to extremely high temperatures on which an illustrative embodiment of the bearing structure comprising the instant invention is mounted. The shaft is provided with a portion having a diameter smaller than the diameter of the remainder of the shaft with the inner race support structure of the bearing being mounted in opposed relation with the narrowed shaft portion. The bearing outer race support structure is secured to the shaft enclosure with the inner and outer races for the bearing being secured respectively to the inner and outer bearing support structures. Heat conductive means are secured to the inner race supporting structure adjacent the upper and lower ends of the races and are disposed with one surface thereon located closely adjacent the outer race supporting structure. A running clearance is provided between the last mentioned surfaces of the heat conductive means and the outer race supporting structure to permit rotation of the heat conductive means relative to the outer race of the bearing. The clearances, however, are minimized so that the path from the heat conductive rings to the outer race supporting structure is the least resistive heat flow path in the bearing assembly whereby a substantial portion of the heat developed in the inner race support structure for the bearing bypasses the bearings and its associated races and flows directly to the supporting structure for the outer bearing race. Our present understanding of the operation of the invention is that heat is radiated across the clearances. It is to be noted however, that convection flow thereacross may also take place.

In furtherance of this purpose, fluid circulating means are secured to the inner race supporting structure to provide a cooling path around the outer periphery of the bearing supporting structures. In addition, the outer race supporting structure is coupled in heat conductive relationship with the casing upon which the bearing is mounted. Thus, any heat in the outer race supporting structure is transmitted to the casing. This heat is removed from the casing by suitable means, such for example, as by the passing of cooling means adjacent the outer surface of the casing.

In accordance with the invention, the inner race supporting structure for the bearing is maintained in spaced relationship with the rotating shaft, by mounting the inner race supporting structure thereon in a cantilever arrangement, so that heat transmitted from the shaft to the inner race supporting structure is minimized. In addition, the shaft may also be provided with means for preventing the flow of heat from the shaft to the adjacent bearing structure. One such means is illustrated in the exemplary embodiment of this invention as a thermal barrier secured to the shaft and which provides a totally enclosed stagnant cavity to limit heat transmission therethrough in a manner well known in the art.

Referring now specifically to FIGS. 1 through 4, it is to be noted that the illustrative embodiment of this invention is shown in combination with a motor structure so that the operation of the invention may be more clearly understood. The motor structure is described herein somewhat schematically and for a more complete description thereof, reference may be had to our copending application entitled "Sealed Motor Pump Unit," Serial No. 716,163, filed February 19, 1958, now Patent No. 2,994,004, and assigned to the same assignee as the instant invention.

The bearing assembly of the invention, denoted generally by the reference character 20 is illustrated as an antifrictional means utilized with a motor structure 22. The motor 22 is provided with a rotor 24 having an elongated central cavity 26 therein, which is utilized to reduce the weight of the rotor 24. The rotor 24 includes, in addition, a plurality of longitudinally mounted conductors 28 as described more specifically in the aforementioned copending application. The rotor 24 is mounted in this example in a vertical cantilever fashion wherein antifrictional means are disposed only below the rotor. The windings 28 extend outwardly from a supporting tube 30 which defines the central cavity 26 and joined, as by welding at its lower end to an end plate 32. The end plate 32 is formed of annular configuration with the upper end 34 of the rotor shaft 36 being fixedly secured within the opening 38 in the end plate 32.

The shaft 36 adjacent its upper end 34 is provided with an outwardly extending projection 40 thereon with the projection 40 and the upper end 34 cooperating to form a shoulder 42 on the shaft. The shoulder 42 is located to engage the lower surface of the end plate 32 adjacent the opening 38 therein and the shaft 36 is secured to the end plate 32 by suitable means as by welding. The shaft 36 adjacent the lower end of the projection 40 is provided with a pair of inwardly tapered portions 44 and 46 and is provided, in addition, with a pair of axially spaced ribs 48 and 50 formed integrally thereon. Each of the ribs 48 and 50 are provided with the same diameter with the diameters thereof being less than the diameter of the tapered portion 46. A sleeve member 52 is mounted on the shaft 36 and cooperates with the ribs 48 and 50 and the tapered portion 46 of the shaft to form a thermal barrier for the shaft 36.

The inner diameter of the sleeve 52 is equal to the diameter of the ribs 48 and 50 with the outward end of the ribs 48 and 50 being located to engage the inner surface of the sleeve 52. The upper end 54 of the sleeve 52 butts against the lower surface of the tapered portion 46 and the sleeve 52 is fixed in position by an annular retaining ring 56 which engages the lower end of the sleeve 52. The retaining ring 56 is mounted on a circumferential projection 58 on the shaft and may be fixedly secured in place by suitable means as by welding the retaining ring 56 to the projection 58. If desired, the sleeve 52 may be fixedly secured in place by suitable means, such as, by welding of the upper end 54 to the tapered portion 46 and welding of the lower end of the sleeve to the retaining ring 56. The sleeve 52 is spaced from the main portion of the shaft 36 to provide a "dead" space 60 therebetween. The ribs 48 and 50 serve to support the sleeve 52 so that the latter cooperates with the shaft to form a thermal barrier whereby the heat developed in the shaft 36 is limited in its dissipation in the radial direction.

The inner support structure 62 for the bearing 20 is mounted in a cantilever fashion and is provided with an annular configuration. The upper end of the inner support structure 62 is provided with a relatively thick integral annulus 64 with its upper surface engaging the lower surface of the end plate 32 and with its inner surface engaging the outward surface of the shaft projection 40 through a light press fit. The annulus 64 adjacent its upper surface is provided with an outwardly extending circumferential tab 66. An annular clamp 68 is located adjacent the tab 66 and is provided with a projection 70 which overlies a portion of the tab 66. The clamp 68 serves to secure the inner support structure 62 in place. In furtherance of this purpose, the clamp 68 is positioned with its projection 70 overlying a portion of the tab 66 and the clamp 68 is secured to the end plate 32 by suitable means, such as, by screws 70 (of which one is shown in the drawing) which pass through aligned openings in the clamp 68 and end plate 32 and which threadedly engage the openings in the end plate 32. The lower surface 74 of the annulus 64 is provided with an integral downwardly extending tubular portion 76. The tubular portion 76 is formed to be extremely thin so that heat conduction from the annulus 74 to the tubular portion 76 is limited. Of course, a limiting feature of the thickness of the tubular portion 76 is the strength requirements therefor inasmuch as the inner support structure for the bearing 20 is secured thereto. Thus, the tubular portion 76 is formed of minimal thickness, but is constructed to be strong enough to withstand the forces exerted thereon by the bearing 20.

The inner race support is formed integrally with the lower end of the tubular portion 76 and is of annular configuration. The inner support structure 62 is provided with a relatively thick portion adjacent the upper end thereof to which there is secured a radially extending annular heat dissipation ring 80. The heat dissipation ring 80 extends radially outwardly from the portion 78 of the inner support structure 62 and is located in position through a light press fit between the inner surface 82 thereof and the outer surface 84 of the portion 78. In furtherance of this purpose, positioning lugs 86, of which only one is shown, extend through the ring 80 and are located in suitably provided openings in the portion 78. The inner support structure 62 is provided at its lower end with a reduced portion 88 which forms a circular shoulder 90 on the outwardly facing surface of the inner support structure 62. A lower heat dissipating ring 92 is positioned to extend radially outwardly from the reduced portion 88 of the inner support structure 62. The shoulder 90 serves to position the ring 92 axially relative to the inner support structure 62 and the ring 92 is secured to the inner support structure 62 in the same manner as the upper ring 80. Thus, a light press fit is provided at the surfaces 94 and 96 of the ring 92 and reduced portion 88, respectively. In addition, lugs 98 extends radially through the ring 92 and into aligned openings in the reduced portion 88 in the manner heretofore described in connection with the lugs 86.

The outer race of the bearing 20 is provided with a support structure 100 which is fixedly positioned in juxtaposed relation with the inner support structure 62 in a manner hereinafter described. The outer surfaces of the heat conducting rings 80 and 92 are maintained in opposed relation with portions of the outer race support structure 100 and there is provided therebetween running clearances 102 and 104 which prevent interference of these members when the rotor 24 is being rotated. The running clearances 102 and 104 are minimized so as to permit radiation of heat from the heat conducting rings 80 and 92 to the outer race support structure 100. It has been found that a running clearance on the order of 0.010 to 0.012 inch is sufficient to permit substantial heat radiation from the rings 80 and 92 to the outer race support structure 100. The upper surface 106 of the ring 80 is tapered inwardly in order to permit a substantial heat radiation area adjacent the running clearance 102.

In the present example of this invention the bearing 20 is illustrated as a ball bearing which is to be lubricated by conventional lubricants and which, in addition, supports the weight of the rotor 24. Thus, in this example of the invention the bearing 20 is adapted to be exposed only to down-thrust of the shaft 36 and any up-thrust of the shaft 36 is taken care of by suitable means (not shown). Of course, the bearing 20 may be formed to accommodate up-thrust as well as down-thrust by conventional techniques well known in the art. In addition, this example of the invention is shown in combination with a cantilever mounted rotor wherein it is contemplated that the bearing 20 comprises the upper anti-fractional means for the rotor. Additional anti-frictional means may be provided for the rotor and for specific examples of such additional anti-frictional means reference is again made to our aforementioned copending application wherein there is shown a lower bearing structure which is adapted to provide additional support for the cantilever mounted rotor 24.

In accordance with this example of the invention, the outer race supporting structure is provided with an inwardly and upwardly extending shoulder 108 which is adapted to receive and position the inner race 110. The inner race 110 is of annular configuration and is generally L-shaped in cross section. Thus, the upstanding portion of 112 of the inner race 110 is supported at its outer surface by the inwardly facing surface of the support structure 100 and is preferably positioned thereagainst by a light press fit. Axial downward movement of the race 110 is prevented by the shoulder 108. In order to accommodate the down-thrust imposed upon the bearing 20, the lower end 114 of the outer race 110 extends inwardly of the upstanding portion 112 thereof so that the lower surface of the ball 116 is engageable therewith to pass the down-thrust imposed on the ball 116 to the outer race 110.

The inner race 118 is mounted in opposed relation with respect to the outer race 110 and is also generally L-shaped in cross section. A shoulder 120 is formed on the inner race supporting structure 62 and is faced downwardly. Thus, the upstanding portion of the bearing inner race 118 is provided to engage the outwardly facing surface of the inner support structure 62 by suitable means such as by a light press fit and movement of the inner race 118 in the upward direction is prevented by the shoulder 120. The radially extending portion 122 of the inner race 118 extends outwardly from the upstanding portion of the inner race 118 to overlie a portion of the ball 116. It is to be noted therefore, that down-thrust exerted on the bearing 20 by the rotor is transmitted to the inner race supporting structure 62 to the inner race 18, the ball 116, the outer race supporting structure 100, respectively.

In view of the weight of the cantilever mounted rotor 24, it is to be noted that additional means for locating the races 110 and 118 in position are unnecessary inasmuch as the weight of the rotor 24 prevents downward movement of the inner race 118 and upward movement of the outer race 110.

It can be seen that the inner and outer races 118 and 110 are spaced from the upper and lower rings 80 and 92, respectively by clearances 119 and 121 (FIG. 2) so that heat in the rings 80 and 92 is impaired from passage to the races.

The balls 116 of the bearing 20 are lubricated by conventional lubricating means such as by grease or oil. During operation of the bearing some of the lubricating means is expelled by the balls 116 and flows downwardly into the lower portion of the bearing 20. The upwardly facing surface of the ring 92 is provided with a dished recess 124 to receive the excess lubricant.

The motor housing 22 is provided with a lower end plate 130 having a central opening 132 therethrough in which the lower end of the shaft 36 is closely received. The end plate 130 is provided with an upstanding annular bearing support member 134 formed integrally thereon which supports the outer race 110 and its associated supporting structure 100 for the bearing 20. In furtherance of this purpose, the inward surface of the upstanding portion 134 is provided with a plurality of radially extending spaced axial ribs 136 (FIGS. 3 and 4) disposed on the entire inner periphery thereof. The ribs 136 may be formed integrally with the end plate 130 by machining openings 138 therebetween. The inward surface of each of the ribs 136 adjacent the lower end thereof is provided with outwardly extending portion 140 (FIG. 2) which forms an upwardly facing circumferential shoulder 142. The shoulder 142 is disposed to receive a complementary shoulder 144 formed on the outward surface of the outer race support structure 100. Inasmuch as the outer race support structure 100 is subjected only to down-thrust, the support structure 100 is fixedly located by the engagement of the shoulders 144 and 142. For other applications, it is to be noted that the support structure 100 may be fixedly secured to the ribs 136 by conventional means such as by welding at the ends thereof.

In the present example of this invention the rotor cavity of the motor is sealed by means of an enclosure or can 146. The can 146 is generally cylindrical with one end thereof being enclosed by a hemispherical portion 148 (FIG. 1). The portion 148 may be formed integrally with the enclosure 146 or may be formed separately and secured to the enclosure 146 by suitable means such as by welding. The enclosure 146 is opened at its lower end and is secured to the lower end plate 130 by means presently to be described.

The upstanding portion 134 of the lower plate 130 terminates at its upper end with a relatively thick outwardly extending circumferential projection 150. The outer surface of the projection 150 adjacent its upper end is divided with an outwardly facing shoulder 152 on which a sealing annulus 154 is located. The sealing annulus 154 is secured to the lower open end of the enclosure 146 by suitable means as by welding. The sealing annulus 154 is secured to the projection 150 by a C-clamp 156. In furtherance of this purpose, adjacent portions 158 and 160 of the annulus 154 and C-clamp 156 are complementarily tapered and the lower end of the C-clamp is provided with a plurality of threaded openings therethrough through which bolts 162 (FIG. 2) are passed for engagement with the lower surface of the projection 150. In the event the hermetic seal is desired for the enclosure of 146 a sealing weld may be made between the lower end of the enclosure 146 and an adjacent portion of the annulus 154. In addition, a sealing weld may be made between the projection 150 and an adjacent end of the annulus 154 such as at 164 for purposes of ensuring a hermetic seal. Obviously, by tightening the bolts 162, the clamping force on the annulus 154 and the projection 150 may be increased to a desired amount.

As pointed out herebefore, the present invention is adapted to be utilized for shafts which are exposed to extremely high temperatures. Suitable lubricants for ball and roller bearings have been tested to operate for at least 500 hours at ambient temperatures on the order of 450° F. For short runs, the lubricant may be utilized in ambient temperatures of the order of 550° F. so that it may be assumed that the upper practical operating limit for conventionally available lubricants is on the order of 500° F. In certain applications, however, it is necessary for the shaft 36 of the motor 22 to be subjected to temperatures on the order of 1000° F. or more. The present invention has been utilized with the shaft 36 being subjected to a temperature of 1000° F. and no bearing difficulties have been encountered. Thus, it may be assumed that in view of the failure of breakdown of the lubricating medium utilized with the bearing 20 the present invention has been capable of maintaining the ambient temperature of the bearing below the upper maximum temperature limit for the lubricants used. To ensure proper operation of the bearing 20, cooling means are provided adjacent the bearing 20 to remove heat there-from. In furtherance of this purpose, the bearing 20 is located in a fluid coolant medium such, for example, as air. Means are provided on the bearing 20 to permit circulation of a cooling fluid about the bearing. A centrifugal pump 170 is disposed below the heat conducting ring 92 for circulation of the fluid coolant. In this example, a plurality of radially extending vanes 172 are secured to the lower surface of the ring 92 by suitable means as by welding. The vanes 17 are radially spaced along the ring 92 and are each secured at its lower end to an annular plate 174.

Figure 2:
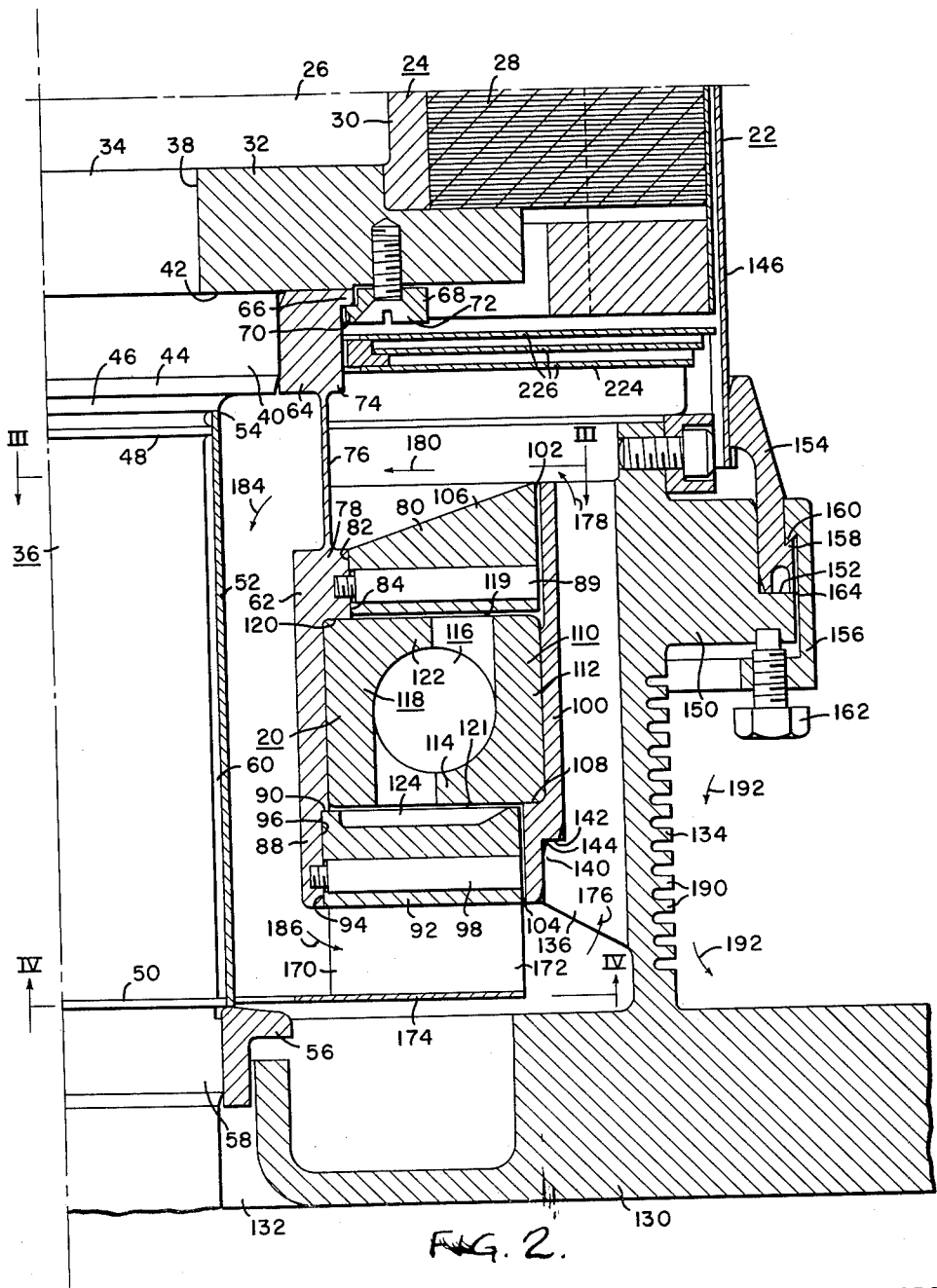
FIG. 2 is an enlarged sectional view of the bearing arrangement of FIG. 1.
Figure 4:
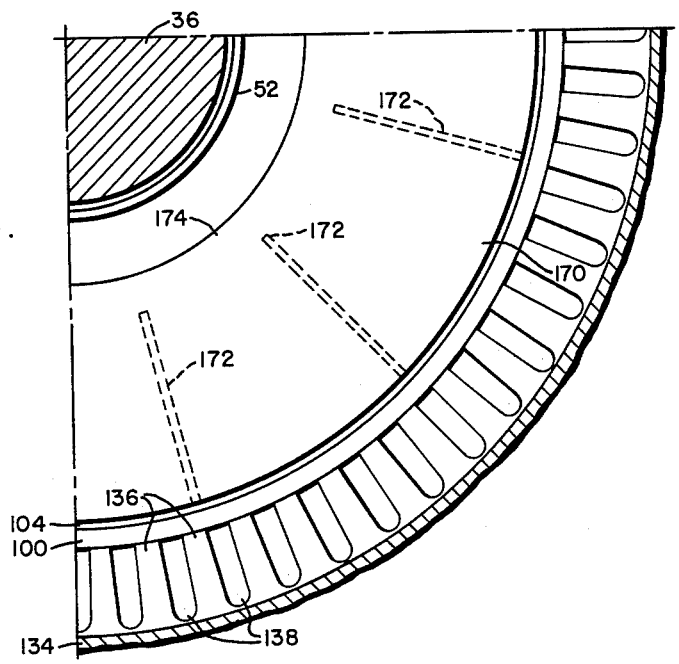
FIG. 4 is a sectional view of the bearing structure shown in FIGS. 1 and 2 and taken along the lines IV—IV of FIG. 2.
Figure 3:
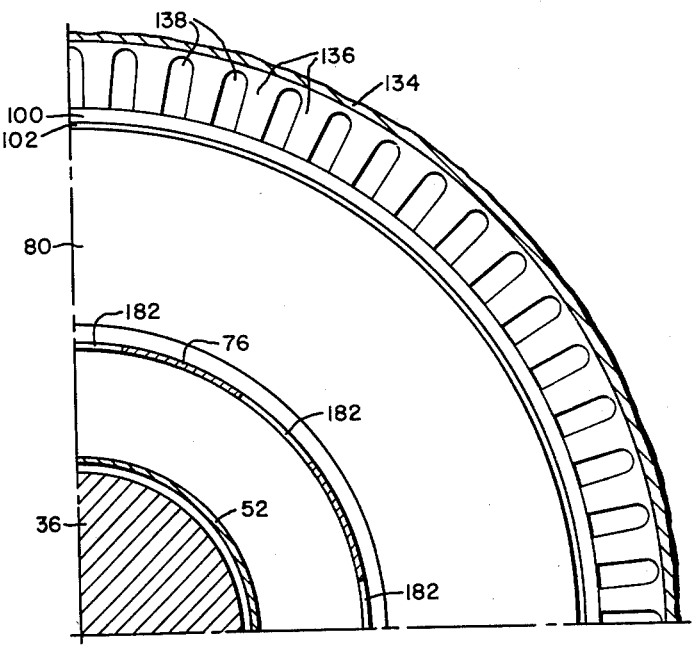
FIG. 3 is a sectional view of the bearing structure shown in FIGS. 1 and 2 and taken along the lines III—III of FIG. 2.

In accordance with the invention, the cooling medium for the bearing 20 is circulated by the centrifugal pump 170 as the latter is rotated by the shaft 136. Accordingly, the cooling medium is impelled by the pump 170 from the outward end thereof into the openings 138 disposed between the ribs 136 as indicated by the flow arrow 176 (FIG. 2). The cooling medium then passes through each of the openings 138 to absorb heat radiated to the outer race supporting structure 100 in the manner heretofore described and exits from the opening 138 as indicated by the flow arrow 178. The cooling medium then flows in a vertical direction past the surface 106 of the upper ring 80 as indicated by the flow arrow 180 and thence through openings 182 (FIG. 3) in the sleeve member 76 and into the annular space defined by the sleeve 52 and the inner race supporting structure 62 as indicated by the flow arrow 184. The cooling fluid absorbs heat from the sleeve 52 and inner race supporting structure 62 as it flows therepast. The cooling means then passes through the suction side of the pump 70 as indicated by the flow arrow 186 and, while flowing through the pump 170 absorbs heat from the lower surface of the ring 92. Heat absorbed by the cooling fluid is dissipated to the upstanding portion 134 of the end plate 130.

In furtherance of this purpose, a plurality of axially spaced circumferential fins 190 are disposed on the outward surface of the upstanding portion 134. The fins 190 are cooled by cooling means flowing past the outer side of the upstanding portion 134 as indicated by the flow arrows 192. The cooling means for the fins 190 may comprise any well known fluid such as, air and is circulated therepast by suitable means to be described.

Referring now to FIG. 1 of the drawings, it is to be noted that the housing for the motor 22 includes an outer stator sleeve 191 which is enclosed at its lower end by the end plate 130 and at its upper end by an end plate 193. The sleeve 191 includes a plurality of openings 194 disposed adjacent the lower end thereof which permit cooling fluid to exit from the sleeve 190. An opening 196 is disposed centrally of the upper end plate 193 and there is secured there adjacent a cylindrical support tube 198 on which suitable fluid circulating means (not shown) such as a blower is mounted. The stator 200 surrounds the enclosure 146 and is secured in place by a stator sleeve 202. The stator sleeve 202 is provided with an enlarged upper opening 204 therein with the latter opening communicating with the opening 196 and the upper end plate 193. The sleeve 202 is, in addition, provided with openings 206 and 208 adjacent the lower end thereof and each of the openings 204, 206 and 208 are manifolded together by a cover plate 210. For a more detailed description of the stator construction and of the cooling means associated therewith, reference may again be had to our aforesaid copending application.

The cooling means for the stator, also communicates with the fins 190 for cooling the latter. This object is achieved by passing the cooling means through the opening 196 as indicated by the flow arrow 212. The cooling fluid then passes about the upper end turn of the stator and through the opening 204 as indicated by the flow arrow 214, the cooling fluid then passes the stator sleeve 202 and the cover 210 as indicated by the flow arrow 216 and a portion of the coolant is passed through openings 218 in the stator. The remainder of the cooling fluid passes through the openings 206 and 208 to cool the lower end turns of the stator 200 and the fins 190, respectively.

As seen in FIG. 1, an annular plate 220 is disposed between the openings 206 and 208 to form a chamber 222 adjacent the fins 190. One of the cover plates 210′ is constructed to be shorter than the remaining cover plates 210 so that one of the openings 208 is exposed to the exterior of the housing, in this manner the cooling fluid is passed from the chamber 222 to the exterior of the motor 22 through the opening 208 and the openings 194, respectively.

Referring now to FIG. 2, it is to be noted that an annular thermal barrier 224 is disposed in the rotor cavity between the rotor 24 and the bearing 20. The thermal barrier may be constructed by any conventional means, such, as, by the use of a plurality of spaced plates 226 which serve to limit the transfer of heat from the lower portion of the rotor cavity to the rotor. The thermal barrier 226, in addition, limits the flow path of the cooling fluid for the bearing 20 in the manner heretofore described.

In accordance with the invention, the shaft 36 may be subjected to temperatures greater than the maximum allowable operating temperature for the bearing 20. The flow of heat from the shaft to the bearing is impaired by the sleeve 52 in the manner heretofore described. The inner race supporting structure 62 is coupled to the shaft projection 40 by its upper portion 64. The heat transmitted to the upper portion 64 is limited in its flow to the races 118 and 110 by the relatively thin tubular portion 76. In addition, the tubular portion 76 is cooled by the cooling fluid as indicated by the flow arrows 180 and 184. Heat developed in the portion of the inner race structure adjacent the inner race 118 is provided with a preferential flow path which bypasses the races and the balls. The preferential flow path is formed by constructing the heat conducting rings 80 and 92 from a material having better heat transfer characteristics than the materials forming the races and the balls. A suitable material for the rings 80 and 92 is a copper alloy. The outward surfaces of the rings 80 and 92 are cooled by the cooling fluid in the manner heretofore described. In addition, heat developed in the conducting rings 80 and 92 is radiated across the clearances 102 and 104 to the outer race supporting structure 100. The heat is then transmitted to the fins 136 and the fins 136 are also cooled by the cooling fluid as indicated by the flow arrows 176 and 178. Heat is also passed from the fins 136 to the upstanding portion 134 of the end plate 130. This heat passes to the radiating fins 190 and the latter are cooled by the cooling means for the stator as indicated by the flow arrows 192.

In accordance with the present invention, novel and efficient bearing arrangements for use in environments subjected to temperatures greater than the upper temperature limit of the bearing have been disclosed. It is obvious to those skilled in the art that many modifications can be made in the embodiment of the invention described in detail herein. Accordingly, it is our specific intention that the foregoing specification be interpreted in an illustrative rather than in a limiting sense.

We claim as our invention:

1. A bearing assembly suitable for use with a shaft which is subjected to high temperatures comprising, a shaft, an annular member having an inner race supporting structure for said bearing assembly coupled thereto, means fixedly securing said annular member to said shaft in a cantilever arrangement with said inner race supporting structure being disposed in spaced relation with said shaft, and a thermal barrier secured to said shaft and located between said shaft and said inner race supporting structure.

2. In a bearing assembly the combination comprising, inner and outer race supporting structures, inner and outer races mounted on said structures, respectively, a pair of ring members secured respectively to an outward surface of said inner race supporting structure and located to extend along the ends of said races, the outer ends of said rings being located closely adjacent said outer race supporting structure so that heat developed in said inner race supporting structure is transmitted to said rings and is radiated from said rings to said outer race supporting structure, whereby the path of heat flow in said bearing assembly bypasses said races.

3. In a bearing assembly the combination comprising, a rotatable shaft, inner and outer race supporting structures, inner and outer races mounted on said structures, respectively, means for mounting said inner race supporting structure in a cantilever manner on said shaft with a portion of said inner race supporting structure being spaced from said shaft, a pair of ring members secured to said inner race supporting structure and located to extend along the ends of said races, respectively, the outer ends of said rings being located closely adjacent said outer race supporting structure so that heat developed in said inner race supporting structure is transmitted to said rings and is radiated from said rings to said outer race supporting structure, whereby the path of heat flow in said bearing assembly bypasses said races, and heat dissipating means disposed between said shaft and said portion of said inner race supporting structure.

4. In a bearing assembly the combination comprising, inner and outer race supporting structures, inner and outer races mounted on said structures, respectively, a pair of heat conductive ring members secured respectively to said inner race supporting structure and located to extend along the ends of said races, the outer ends of said rings being located closely adjacent said outer race supporting structure so that heat developed in said inner race supporting structure is transmitted to said rings and is radiated from said rings to said outer race supporting structure, whereby the path of heat flow in said bearing assembly bypasses said races, a rotatable shaft, means fixedly securing said inner race supporting structure to said shaft in a cantilever arrangement with a portion of said inner race supporting structure being in spaced relation with said shaft, a housing member mounted in opposed relation with at least a portion of said shaft, means for mounting said outer race supporting structure to said housing member and means for removing heat from said housing member.

5. A bearing assembly suitable for use with a rotatable shaft which is subjected to high temperatures comprising, a housing having a shaft at least in part disposed therewithin, means mounting the inner and outer race supporting structures for said bearing assembly respectively to said shaft and said housing, said last mentioned means being disposed to space a portion of said inner race supporting structure from said shaft and forming a cooling passage therebetween, said housing having a plurality of axial flow passages located intermediate a wall portion thereof and said outer race supporting structure, a cooling fluid disposed in said housing adjacent said bearing assembly, and fluid circulating means mounted on said inner race supporting structure for circulating said fluid in a recycling path through said cooling passages and said axial flow passage to cool said race supporting structures.

6. A bearing assembly comprising, a housing having a shaft at least in part disposed therewithin, inner and outer race supporting structures for said bearing assembly, means fixedly locating said inner race supporting structure on said shaft, said housing having a plurality of radially spaced axially extending inward projections on the inner surface thereof, means for securing the outer race supporting structure to the inward surface of said projections, and means disposed in said housing for circulating a cooling fluid between each of said projections for cooling said outer race supporting structure.

7. A bearing assembly comprising, a housing having a shaft at least in part disposed therewithin, said shaft being subjected to axial thrust in only one direction, inner and outer race supporting structures for said bearing assembly, means fixedly mounting said inner race supporting structure to said shaft, said housing having a plurality of radially spaced axially extending inward projections located on the inner surface thereof, said projections being formed to provide a circumferential shoulder on the inward surface thereof facing the direction opposite to said one direction, said outer race supporting structure being formed to be closely received by the inward surfaces of said projections and having a shoulder formed on the outward surface thereof which engages said circumferential shoulder, and means disposed within said housing for circulating a cooling fluid between each of said projections for cooling said outer race supporting structure.

8. A bearing assembly for a rotatable shaft comprising a shaft having a circumferential projection thereon, an annular race supporting structure for said bearing assembly, said race supporting structure having a relatively thin axial extension thereon which terminates in a relatively thick integral annular end portion, the inward surface of said end portion being formed to closely receive said circumferential projection, means fixedly mounting said race supporting structure in a cantilever arrangement on said shaft, said means being formed to secure said end portion to said projection, and said extension having at least one opening therethrough.

9. A bearing assembly suitable for use with a rotatable shaft which is subjected to high temperatures comprising, a housing having a shaft at least in part disposed therewithin, said shaft having a circumferential projection thereon, an annular inner race supporting structure disposed within said housing, said inner race supporting structure having an axial relatively thin extension thereon, said extension terminating in a relatively thick annular end portion, the inward surface of said end portion being formed to closely receive said projection, means for securing said end portion to said projection, said housing having a plurality of radially spaced axially extending inward projections on the inner surface thereof, an outer race supporting structure disposed between the inward surfaces of said projections, means for securing said outer race supporting structure to said projections, antifrictional means disposed between said inner and outer race supporting structures, fluid circulating means disposed within said housing and secured to said inner race supporting structure, said axial extension of said inner race supporting structure having at least one opening therethrough, whereby a cooling fluid is circulated from said fluid circulating means through the openings between said housing projections, through said opening in said inner race extension and between said inner race supporting structure and said shaft.

10. In combination, a pair of members movable relative to one another, one of said members being at a temperature higher than that of the other of said members thereby forming a high temperature member and a low temperature member respectively, race supporting structures coupled respectively to said members with the race supporting structure which is coupled to said high temperature member being disposed at least in part in spaced relationship with said high temperature member, bearing race means coupled respectively to said supporting structures and mounted in opposed relationship, means forming a heat flow path from said high temperature member to said low temperature member along said supporting structures to bypass said races including a heat conductive member secured to one of said supporting structures, said heat conductive member being disposed to extend closely adjacent the other of said supporting structures so that heat is radiated across the gap therebetween.

11. In combination, a pair of members movable relative to one another, one of said members being at a temperature higher than that of the other of said members thereby forming a high temperature member and a low temperature member respectively, race supporting structures coupled respectively to said members with the race supporting structure which is coupled to said high temperature member being disposed at least in part in spaced relationship with said high temperature member, bearing race means coupled respectively to said supporting structures and mounted in opposed relationship, means forming a heat flow path from said high temperature member to said low temperature member along said supporting structures to bypass said races including a heat conductive ring secured to one of said supporting structures, said heat conductive ring being disposed to extend closely adjacent the other of said supporting structures so that heat is radiated across the gap therebetween.

12. In combination, a pair of members movable relative to one another, one of said members being at a temperature higher than that of the other of said members thereby forming a high temperature member and a low temperature member respectively, race supporting structures coupled respectively to said members with the race supporting structure which is coupled to said high temperature member being disposed at least in part in spaced relationship with said high temperature member, bearing race means coupled respectively to said supporting structures and mounted in opposed relationship, means forming a heat flow path from said high temperature member to said low temperature member along said supporting structures to bypass said races including a heat conductive ring secured to one of said supporting structures, said heat conductive ring being disposed to extend closely adjacent the other of said supporting structures so that heat is radiated across the gap therebetween, and said ring being tapered along radial dimension with the surface of said ring located adjacent said other structure being enlarged with respect to the remainder of said ring.

13. A bearing assembly suitable for use with a shaft that is subjected to high temperatures comprising, a shaft having a narrowed portion thereon, an annular member having an annular inner race supporting portion for said bearing assembly thereon, said annular supporting portion having its inner diameter larger than the diameter of said narrowed portion of said shaft, means securing said annular member to said shaft with said inner race supporting portion being juxtaposed to said narrowed shaft portion said annular member having at least one opening therein disposed to permit the flow of a cooling fluid between said narrowed shaft portion and said annular member, and means mounted on said narrowed portion of said shaft for limiting the radial flow of heat from said shaft toward said inner race supporting portion.

References Cited in the file of this patent

UNITED STATES PATENTS

| | | |
|---|---|---|
| 2,439,127 | Dailey et al. | Apr. 6, 1948 |
| 2,439,709 | Asbury | Apr. 13, 1948 |
| 2,566,715 | Bessiere | Sept. 4, 1951 |
| 2,836,471 | Luenberger | May 27, 1958 |
| 2,869,939 | Muth et al. | Jan. 20, 1959 |
| 2,962,329 | Moore | Nov. 29, 1960 |

FOREIGN PATENTS

| | | |
|---|---|---|
| 129,969 | Switzerland | Oct. 29, 1927 |
| 336,914 | Great Britain | Oct. 23, 1930 |